(12) United States Patent
Wirth et al.

(10) Patent No.: US 9,186,831 B2
(45) Date of Patent: Nov. 17, 2015

(54) METHOD AND DEVICE FOR PRODUCING OF A FORM PART

(71) Applicant: Hennecke GmbH, Sankt Augustin (DE)

(72) Inventors: Juergen Wirth, Cologne (DE); Jens Geuer, Sankt Augustin (DE); Martin Schamberg, Sankt Augustin (DE)

(73) Assignee: HENNECKE GMBH, Sankt Augustin (DE)

( * ) Notice: Subject to any disclaimer, the term of this patent is extended or adjusted under 35 U.S.C. 154(b) by 60 days.

(21) Appl. No.: 14/091,926

(22) Filed: Nov. 27, 2013

(65) Prior Publication Data

US 2014/0151917 A1 Jun. 5, 2014

(30) Foreign Application Priority Data

Dec. 4, 2012 (DE) .......................... 10 2012 023 608

(51) Int. Cl.
*B29C 45/37* (2006.01)
*B29C 45/00* (2006.01)
*B29C 45/76* (2006.01)
*B29C 67/24* (2006.01)
*B29C 70/46* (2006.01)

(52) U.S. Cl.
CPC ............. *B29C 45/37* (2013.01); *B29C 45/0005* (2013.01); *B29C 45/7653* (2013.01); *B29C 67/246* (2013.01); *B29C 70/46* (2013.01)

(58) Field of Classification Search
CPC   B29C 45/0005; B29C 45/37; B29C 45/7653;
B29C 67/246; B29C 70/48
USPC ................................ 264/40.1, 328.6; 425/543
See application file for complete search history.

(56) References Cited

U.S. PATENT DOCUMENTS

| 4,851,167 A | 7/1989 | Marc |
| 5,087,193 A * | 2/1992 | Herbert, Jr. .................... 425/543 |
| 6,663,812 B1 | 12/2003 | Shepheard |

FOREIGN PATENT DOCUMENTS

| DE | 1026278 B | 3/1958 |
| DE | 28 29 016 A1 | 1/1980 |
| DE | 4316154 C1 | 4/1994 |
| DE | 43 20 602 C1 | 5/1994 |
| DE | 19822113 C1 | 9/1999 |
| EP | 00 24 610 A1 | 3/1981 |
| EP | 0024610 A1 | 3/1981 |

(Continued)

*Primary Examiner* — Alison Hindenlang
*Assistant Examiner* — Robert J Grun
(74) *Attorney, Agent, or Firm* — Lucas & Mercanti, LLP

(57) ABSTRACT

The invention relates to a method for producing of a form part, especially of a plane thin-walled fiber composite part, in a mold (1), comprising the steps: a) Providing of the mold (1), wherein the mold (1) comprises a cavity (2) with a nominal form volume (V) for inserting of a reactive mixture, wherein the cavity (2) is delimited by at least one cavity wall section (3) which is elastically deformable during the inserting of the reactive mixture and wherein the modulus of compressibility (K) of the cavity (2) is between 2,000 bar and 10,000 bar; b) Inserting of the reactive mixture into the cavity (2), wherein the reactive mixture is inserted with such a pressure into the cavity (2) so that the cavity volume is increased during the insertion of the reactive mixture due to elastic deformation of the at least one cavity wall section (3) above the nominal form volume (V); c) Letting solidify of the reactive mixture in the cavity (2); d) Demolding of the finished form part from the mold (1). Furthermore, the invention relates to a device for the execution of the method.

11 Claims, 3 Drawing Sheets

(56) References Cited

FOREIGN PATENT DOCUMENTS

Figure 1:
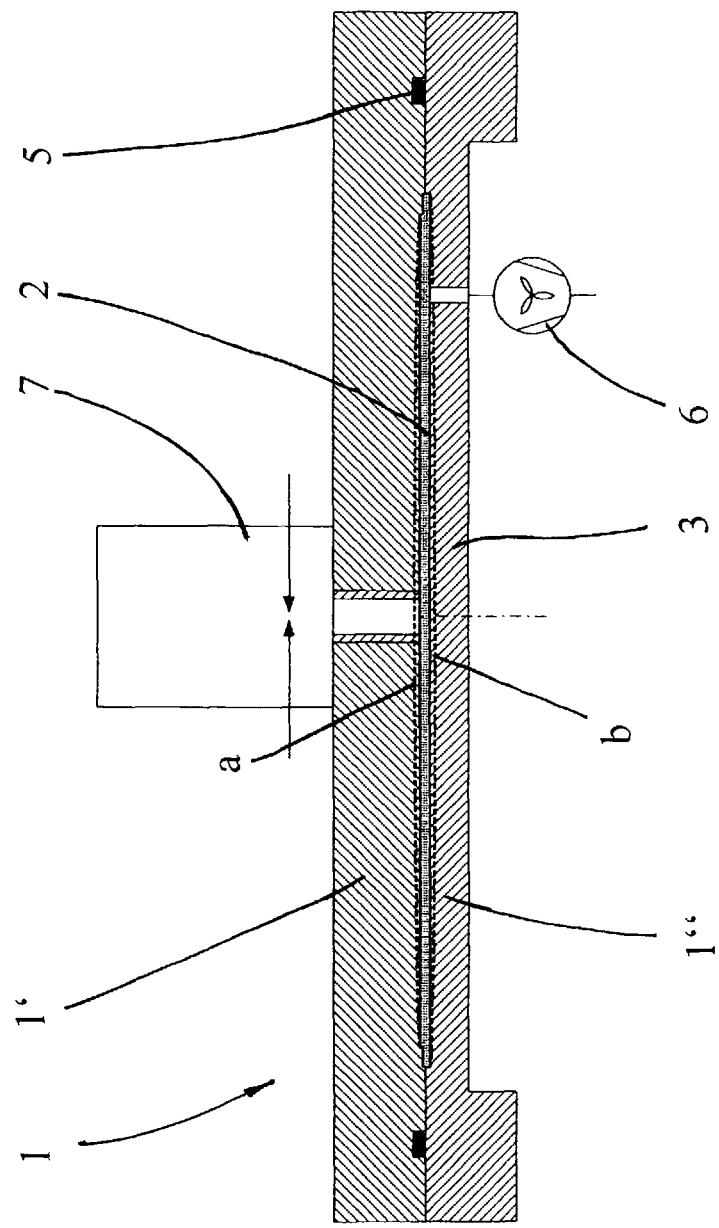

| EP | 0206100 | A2 | 12/1986 |
| EP | 07 53 389 | A2 | 1/1997 |
| EP | 15 66 253 | A2 | 8/2005 |
| FR | 2 889 100 | A1 | 2/2007 |

\* cited by examiner

METHOD AND DEVICE FOR PRODUCING OF A FORM PART

CROSS-REFERENCE TO RELATED APPLICATIONS

This application claims the priority of DE 10 2012 023 608.5 filed Dec. 4, 2012, the priority is hereby claimed and incorporated by reference herein.

The invention relates to a method for producing of a form part, especially of a plane thin-walled fiber composite part, in a mould. Furthermore, the invention relates to a device for the execution of the method.

Especially, the invention relates to a method, in which an at least two-component reactive mixture is injected into a closed form volume of a mould; prior to that a fiber material is inlayed into the cavity. The at least two reaction components are thereby at first mixed and are then injected into the closed mould. After a time of solidification which is dependent from the type of material the mould is opened and the finished fiber compound part is removed.

This technology is known as such and is used in multiple applications. Also, the problem is generally known that due to the chemical and/or thermal shrinkage in the mould during the phase of solidification material displacement from the mould wall (cavity wall) can occur and thus interruptions and an annoyance of the quality at the surface of the form part respectively. Also, air can be dispersed into the reactive mixture during the mixing of the components or during the process of filling which causes sink marks and flowmarks at the part surface. Both phenomenons are well known. In DE 43 16 154 C1, in EP 0 206 100 B1 and in EP 0 024 610 A1 this complex of problems is discussed.

In the mentioned DE 43 16 154 C1 a method for coating of the visible face of an interior part is described in which during the solidification an increased pressure is exerted onto the reactive mixture so that existing air is dissolved in the resin. For this purpose a shearing edge mould is employed in connection with a seal. For the application of the pressure both mould halves are moving to another during the solidification whereby the form volume is reduced and the pressure in the mould is kept constant. The mould design as a shearing edge mould it thereby very complex and thus expensive. Furthermore, the time-depending closing of the mould requires higher demands to the design of the press which is much more cost intensive than a tool with only one closing position.

Also in the mentioned EP 0 206 100 B1 a method is described in which the mould has two different closing positions, so that as in the case of DE 43 16 154 C1 respective high demands to the press exist. The method as described there works not satisfactory if a mould has to be used which should be closed only once and should then only be kept closed.

The mentioned EP 0 024 610 A1 describes inter aha a method by using a mould with elastic deformable mould walls. But the document merely teaches to compensate a total defect in the filling volume up to 100 ml in the case of a mould with a volume of 5 liters by means of elastic mould walls. Simultaneously, it is said that a high rise in the pressure in the mould must be avoided, because this influences the mixing conditions and the quality of the mixture inevitably. In this connection it is said (see page 7, lines 13 to 17) that during the mixing process as such no overfilling of the cavity should occur to avoid detrimental retroactions to the mixing process. From this results a extreme elastic system which at one hand side is very detrimental to the size accuracy of the parts which are to be produced and which at the other hand leads to very thin-walled cavity walls so that the same are deformed permanently at an increased inner pressure in the mould.

At the numerical example are mentioned in EP 0 024 610 A1 a modulus of compression of the cavity of only 500 bar results at an inner mould pressure of e. g. 10 bar—which is actually already away from the teachings of this document because as much as possible no pressure increase in the mixing chamber should occur.

The modulus of compressibility, which is interesting here, describes which pressure change is necessary in the cavity to generate a specified change in the volume of the cavity. The modulus of compressibility is presently $$K = \frac{\Delta p}{\Delta V / V}$$

with
K: modulus of compressibility,
Δp: pressure change in the cavity,
ΔV: volume change in the cavity due to the pressure change,
V: nominal mould volume of the cavity.

With regard to discussed EP 0 024 610 A1 it applies that the modulus of compressibility drops further at still smaller inner pressures of the mould. If a mould as known from this document would be charged with a high outer pressure to increase the inner pressure of the mould and to thereby compress dispersed air this would result at one hand side in a plastic deformation of the mould walls and at the other hand in an undefined geometry of the form part (see also the explanations in EP 0 024 610 A1, page 8, lines 10 to 16: Here is explained to equip the walls of the cavity of the mould with an elastic membrane or to design them as an elastic membrane. But this is only appropriate if the exactness of the contours of the mould in the region of the elastic membrane is not important).

The solution as described in EP 0 024 610 A1 is thus only reasonable for those moulds in which a priori no air is dispersed, to that this air needs not to be compressed by an increased inner pressure of the mould and where only low demands exist with respect to the exactness of the dimensions of the form part or where the elastic membrane is arranged outside of the actual geometry of the form part and is not part of the mould walls which limit the form part.

Thus, for a method according to the kind mentioned above the teaching according to EP 0 024 610 A1 is not suitable. The dispersing of air at least to the beginning of the shot is normally not avoidable and leads inevitably to optical influence of the surface in the case of plane and thin-walled form parts, i. e. to a loss in quality. The positioning of the storage volume outside of the mould walls which delimit the form part results in most applications in too long flow paths so that the volumetric material shrinkage during the phase of solidification cannot be compensated in the whole form part which leads to sink marks or to so-called "orange skin effects" at the surface of the form part.

Thus, it is the object of the present invention to further develop a method and a respective device of the kind mentioned above to that the mentioned disadvantages are prevented. Accordingly, it should become possible to produce also very flat and thin-walled form parts with a perfect surface of the form part and with precise defined geometric dimensions in a simple and process stable manner. Especially, surface marks and voids should be prevented reliably so that form parts with high quality can be produced.

The solution of this object is characterized according to the method in that the method comprises the steps:
a) Providing of the mould, wherein the mould comprises a cavity with a nominal form volume for inserting of a reactive mixture, wherein the cavity is delimited by at least one cavity wall section which is elastically deformable during the inserting of the reactive mixture and wherein the modulus of compressibility of the cavity is between 2,000 bar and 10,000 bar;
b) inserting of the reactive mixture into the cavity, wherein the reactive mixture is inserted with such a pressure into the cavity so that the cavity volume is increased during the insertion of the reactive mixture due to elastic deformation of the at least one cavity wall section above the nominal form volume;
c) Letting solidify of the reactive mixture in the cavity;
d) Demoulding of the finished form part from the mould.

Preferably, prior the insertion of the reactive mixture into the cavity according to above step b) fiber material is introduced, especially inlayed, into the cavity.

The reactive mixture is thereby preferably inserted during above step b) in such a way that the inner mould pressure lays between 10 bar and 100 bar. In the easiest case a pressure is chosen which at one hand side deforms the mould, i. e. namely the elastic cavity wall section sufficiently so that the desired storage volume is given, and at which at the other hand the elasticity of the cavity wall makes sure that the cavity wall reaches again its (undeformed) starting position after solidification and occurred shrinkage. For this purpose the pressure must be chosen exactly such high that the resulting storage volume corresponds to the material shrinkage.

After the processing of above step b) and prior the processing of step d) an outer pressure, especially a pneumatic or hydraulic pressure, can be applied onto the at least one cavity wall section, so that the at least one cavity wall section is deformed and the volume of the cavity is reduced. Thus, hereafter the elastic cavity wall is charged with an outer additional pressure prior the solidification of the reactive mixture, whereby the pressure in the mould is increased in such a manner that during the flow through the inlay encased or at the start of the shot in the mixing chamber dispersed air bubbles are brought into solution or are compressed at least in such a manner that after the solidification no visible air bubbles can be realized in the inner and at the surface of the form part. The deformation of said elastic cavity walls is thereby and due to the chemical and thermal shrinkage after the filling process partially or completely re-deformed again, wherein with the aid of the external pressure the pressure within the cavity is kept at a level also during the solidification so that the air in the reactive mixture is compressed insofar that after the solidification no visible air bubbles can be realized in the inner and at the surface of the form part.

Thus, a further embodiment of the invention proposes that the outer pressure which is applied onto the at least one cavity wall section is controlled or feed-back controlled in such a manner that the pressure in the reactive mixture in the cavity, which is not yet solidified, is kept on a predetermined level, especially on a constant value. Because the inner pressure in the mould decreases over the time due to the solidification of the reactive mixture and the chemical shrinkage of the reactive mass which is connected with it, the inner pressure in the mould can be kept constant accordingly by an increase of the outer pressure.

Furthermore, it can be provided that the outer pressure which is applied onto the at least one cavity wall section is increased during the solidification of the reactive mixture. Furthermore, also the outer pressure which is applied onto the at least one cavity wall section can be decreased during the solidification of the reactive mixture. It is also possibly that an increase as well as a decrease of the pressure is run in the form of a pressure profile.

A special and beneficial embodiment suggests that the outer pressure which is applied onto the at least one cavity wall section is controlled or feed-back controlled in such a manner that the pressure in the reactive mixture in the cavity, which is not yet solidified, decreases from a pressure level immediately after the insertion of the reactive mixture according to above step b) of at least 50 bar during letting solidify the reactive mixture according to above step c).

A very precise geometry of the form part to be produced is guaranteed according to a further embodiment in that the outer pressure which is applied onto the at least one cavity wall section is controlled or feed-back controlled in such a manner that the deformation of the at least one cavity wall section becomes zero till the end of letting solidify the reactive mixture according to above step c). The outer pressure can thus be adjusted to the end of the reaction in such manner that the deformation of the mould walls are eliminated and so form parts with an exact defined wall thickness are produced.

The proposed device comprises a mould with a cavity with a nominal form volume. The invention provides that the cavity comprises at least one cavity wall section which delimits the cavity and which is designed in such a way that it deforms elastically during the insertion of the reactive mixture, wherein the modulus of compressibility of the cavity is between 2,000 bar and 10,000 bar.

The at least one elastically deformable cavity wall section can be connected with means by which an external pressure can be applied onto the cavity wall section.

In experiments with very different form part geometries and form volumes it was found out during the use of the proposed method surprisingly, that it is sufficient for most of the applications independent from the different basic conditions to design the mould in such a manner that it has a defined elasticity which can be defined analogue to the modulus of compressibility of fluids (for the definition of the modulus of compressibility as it is used here, see above). So, it was possible to produce in a relative simple manner large-area parts, like e. g. large-area vehicle structural part, without surface damages while the moulds for small parts, like e. g. shells for mobile telephones, have been often to stiff.

In general form moulds are built too stiff when they are produced according to general design rules by using of respective norms. It succeeded by the re-design of the mould according to the solution due to the invention to produce also those small form parts without surface damages and marks. So, a very simple parameter was found by means of which moulds can be designed with the support of modern software tools, by which deformations can be calculated in dependence from the inner pressure very precisely, so that the problem of surface marks can be prevented at those form parts.

Thus, the proposed idea is basing especially on a method for the production of plane fiber composite form parts, in which the reactive mixture is injected into a closed mould volume in which a fiber material is inlayed, wherein regions of the mould wall which delimits the mould volume are designed elastically deformable. Thereby, the mould is purposeful overfilled so that the elastically deformable regions of the mould wall which delimits the mould volume are so deformed that the mould volume becomes bigger during filling. The mould is thereby so designed and built respectively that it comprises a modulus of compressibility (definition see above) is in the region between 2,000 bar and 10,000 bar.

Thereby, the modulus of compressibility is defined in analogy to the modulus of compressibility e. g. of a liquid. It defines how the mould volume and cavity volume respectively changes in dependence of a pressure change and in dependency of the pressure in the cavity respectively.

Thereby, the boundaries as proposed by the invention are essential:

At a too low mould elasticity, i. e. at a modulus of compressibility above 10,000 bar, a too high pressure must be built up in the mould to reach a sufficient storage volume due to the widening of the cavity volume so that it can balance the chemical and thermal shrinkage. Too high pressures of injection act at the one hand negative with respect to the metering time of the liquid reaction mixture, at the other hand they demand especially at large-area form parts extreme high holding forces for the mould and thus heavy and expensive presses. Due to this reason a sufficient high elasticity of the mould is necessary, corresponding to a modulus of compressibility below 10,000 bar.

However, a too high elasticity of the mould, i. e. a modulus of compressibility below 2,000 bar, leads to problems concerning the demanded dimension of the form part. An increased inner pressure in the mould during the filling and solidification is necessary to bring the air into solution which is dispersed especially at the beginning of a shot or at least to reduce the air volume in such a manner that visual damages like flowmarks and sink marks (e. g. dry fibers) in the finished form part are avoided. However, if this inner pressure in the mould causes that the mould volume expands too much or if the mould even opens due to the filling pressure and becomes untight, it is difficult to keep the demanded tolerances with respect to the dimensions of the form part and to produce form parts at all respectively. Therefore, the elasticity of the mould is limited downwards in such a manner that the modulus of compressibility of the cavity is above 2,000 bar.

The demanded modulus of compressibility within the claimed borders is realized for example so that the wall thicknesses of the mould are adjusted correspondingly, wherein however the mould is made such massive in the region of the circumferential sealing edges that the mould becomes not untight under the influence of the filling pressure. In the case of large-area parts it is normally beneficial to reduce the wall thickness in several regions of the mould wall which are separated from another, wherein the thin-walled regions are interrupted by bars and by thick-walled regions respectively. By doing so it is prevented that the mould is bulging substantially only in the middle, what lead to this that the material must flow too long paths which material shrinks during the solidification and which is only limited flowable in this state. Because the resulting slight bulges are however visible at form parts with bright surfaces, the elastic regions of the mould wall should lay on the non-visible sides of the form part in this case.

The adjustment of the modulus of compressibility of the cavity of the mould is done in a workmanlike manner by designing and choosing respectively the at least one elastic wall section with respect to its dimensions correspondingly. Is for example the thickness of the elastic wall section chosen too big the modulus of compressibility becomes also too big correspondingly. Is said wall thickness reduced also the modulus of compressibility is decreased.

Figure 2:
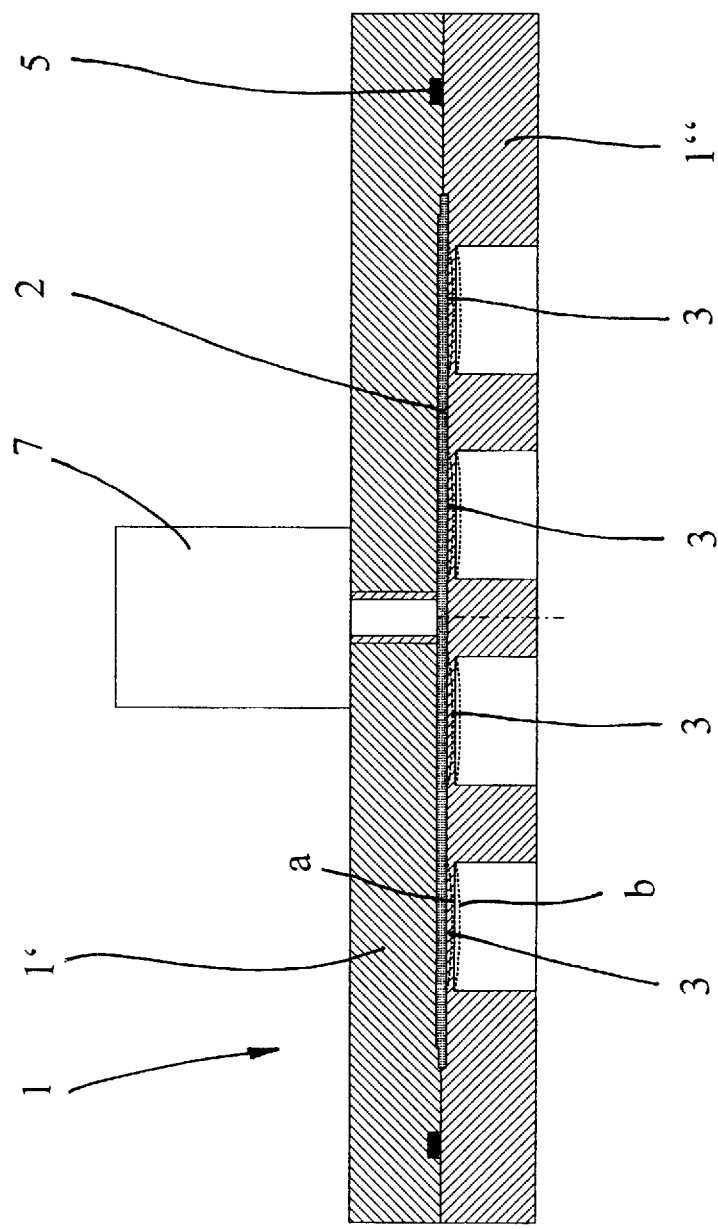
Figure 3:
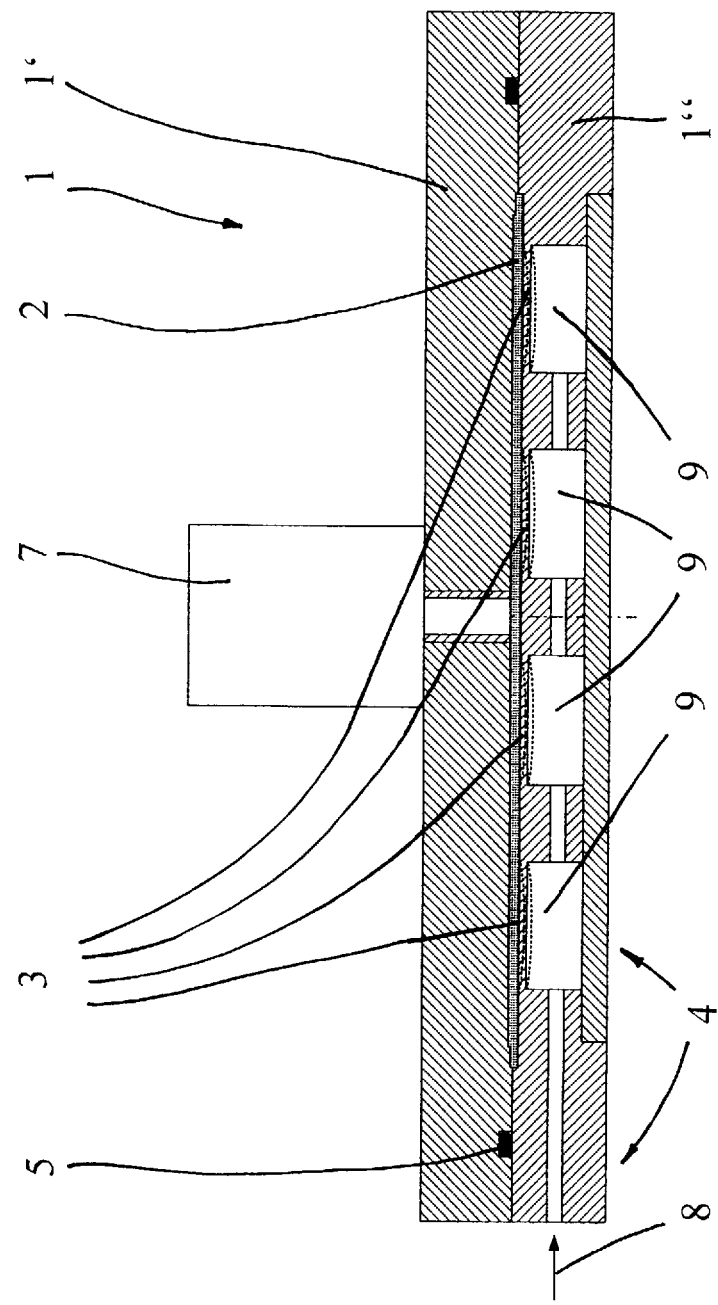

In the drawings embodiments of the invention are depicted. It shows:

FIG. 1 a mould with a cavity and a mounted mixing head, wherein the mould comprises an elastic wall which delimits the cavity, FIG. 2 a mould analogue to that one according to FIG. 1, wherein several elastic wall regions of the cavity are provided and FIG. 3 a mould basing on that one according to FIG. 2, at which as a further development means are provided for applying an external pressure onto the elastic wall regions.

In the figures a mould 1 is shown which has a cavity 2 which is designed for the forming of a form part. The mould consists of an upper part of the mould 1' and a lower part of the mould 1". Between the two mould halves, i. e. in the cavity 2, a fiber material is inlayed in each case which is slightly pressed from the outside and is fixed by doing so. At an even fares outer position a circumferential seal 5 is arranged which serves to establish the leak tightness when prior to the injection of reactive mixture the cavity 2 and the fiber material is evacuated to minimize the remaining air. For doing so a vacuum unit 6 is arranged in FIG. 1.

FIG. 1 shows a simple design of a mould 1 according to a first embodiment of the invention. The mould 1 is filled via the single mixing head 7 with an at least two-component reactive mixture (polyol and isocyanate in the case of the processing of polyurethane) so far that the mould 1 with an elastic cavity wall section 3 bulges a little.

The circumferential seal 5 takes care that the mould 1 can be evacuated by means of the vacuum unit 6 prior the injection of the reactive mixture. Due to the design of the mould 1 according to the invention the volume of the mould and the cavity 2 respectively is enlarged as can be seen by the dotted lines a and b and namely just so far that in the additional free cavity volume sufficient material (reactive mixture) can be stored to compensate the volume loss during the solidification and cooling due to the chemical and thermal shrinkage.

However, in the case of larger mould dimensions the flow paths during the solidification become too long, because most of the material is naturally stored in the middle of the mould and the cavity respectively as the mould bulges here mostly. However, the chemical and thermal shrinkage acts in the whole mould substantially equal if an equal temperature in the mould is assumed. As a result surface damages or sink marks can occur in the edge regions because due to the long flow paths and due to the high flow resistances at the flowing through the fiber material the material which is mainly stored in the middle cannot flow quick enough to the edge regions.

Therefore, it can be beneficial depending on the dimensions and the geometry of the form part to divide the elastic regions 3 of the mould wall in several parts as it is shown in FIG. 2. Thereby, the stored volume distributes more equal along the cavity; thereby, also the flow paths during the solidification and cooling become shorter.

A further and specifically beneficial mould design is shown in FIG. 3. Here, the elastic regions 3 of the mould wall can be charged with air or another medium from the counter side, i. e. from the outer side and can thus be charged with a pressure. For doing so means 4 for applying a pressure are arranged.

The air is introduced via an inlet 8 into outer chambers of the mould 9. In the ideal case this pressure is timely controlled in such a manner that an equilibrium of forces exists between the mould cavity 2 and the outer chambers of the mould 9, wherein the pressure in the inner chamber of the mould is kept at a sufficient high level during the solidification and cooling in the cavity 2 to keep dispersed air in solution and at least to compress it respectively, so that after the solidification no visible air bubbles can be realized at the surface of the form part.

Thereby, the membrane-like elastic cavity wall sections 3 are exerted to no or at least only small mechanical tensions after the solidification and cooling so that the form part which is to be produced corresponds very exactly to form of the mould geometry and cavity geometry respectively.

LIST OF REFERENCES

1 Mould
1' Upper part of the mould
1" Lower part of the mould
2 Cavity
3 Elastic cavity wall section
4 Means for applying of a pressure
5 Seal
6 Vacuum unit
7 Mixing head
8 Inlet
9 Outer chamber of the mould
V Nominal form volume of the cavity
K Modulus of compressibility
Δp Pressure change in the cavity
ΔV Volume change of the cavity due to the pressure change
a Deformed state of the upper cavity wall
b Deformed state of the lower cavity wall

The invention claimed is:

1. A method for producing of a form part of a plane thin-walled fiber composite part, in a mould, comprising the steps:
   a) providing a mould, wherein the mould comprises a cavity with a nominal form volume for inserting of a reactive mixture, wherein the cavity is delimited by at least one cavity wall section which is elastically deformable during the inserting of the reactive mixture and wherein the cavity has a modulus of compressibility between 2,000 bar and 10,000 bar;
   b) inserting the reactive mixture into the cavity, wherein the reactive mixture is inserted with such a pressure into the cavity so that the cavity volume is increased during the insertion of the reactive mixture due to elastic deformation of the at least one cavity wall section above the nominal form volume;
   c) solidifying the reactive mixture in the cavity; and
   d) demoulding a finished form part from the mould.

2. The method according to claim 1, wherein prior the insertion of the reactive mixture into the cavity according to step b) fiber material is inlayed into the cavity.

3. The method according to claim 1, wherein the reactive mixture is inserted during step b) such that the inner mould pressure is between 10 bar and 100 bar.

4. The method according to claim 1, wherein after the processing of step b) and prior to the processing of step d), an outer pressure, being one of a pneumatic and a hydraulic pressure, is applied to the at least one cavity wall section, so that the at least one cavity wall section is deformed and the volume of the cavity is reduced.

5. The method according to claim 4, wherein the outer pressure which is applied to the at least one cavity wall section is controlled or feed-back controlled such that the pressure in the reactive mixture in the cavity, which is not yet solidified, is kept constant.

6. The method according to claim 4, wherein the outer pressure which is applied to the at least one cavity wall section is increased during solidification of the reactive mixture.

7. The method according to claim 4, wherein the outer pressure which is applied to the at least one cavity wall section is decreased during solidification of the reactive mixture.

8. The method according to claim 4, wherein the pressure in the reactive mixture in the cavity is at least 50 bar immediately after the insertion of the reactive mixture according to step b), and wherein the outer pressure which is applied to the at least one cavity wall section is controlled or feed-back controlled in such that the pressure in the reactive mixture in the cavity decreases from the pressure level of at least 50 bar while the reactive mixture in the cavity solidifies according to step c).

9. The method according to claim 4, wherein the outer pressure which is applied to the at least one cavity wall section is controlled or feed-back controlled such that the deformation of the at least one cavity wall section becomes zero till the end of solidifying the reactive mixture according to step c).

10. Device comprising a mould with a cavity with a nominal form volume for execution of the method according to claim 1,
    wherein
    the cavity comprises at least one cavity wall section which delimits the cavity and which is designed in such a way that it deforms elastically during the insertion of the reactive mixture, wherein the modulus of compressibility of the cavity is between 2,000 bar and 10,000 bar.

11. Device according to claim 10, wherein the at least one elastically deformable cavity wall section is connected with means by which an external pressure can be applied onto the cavity wall section.

* * * * *